March 19, 1957 R. C. LUNDQUIST 2,785,883
CUTTER BIT AND MOUNTING THEREFOR
Original Filed July 9, 1953
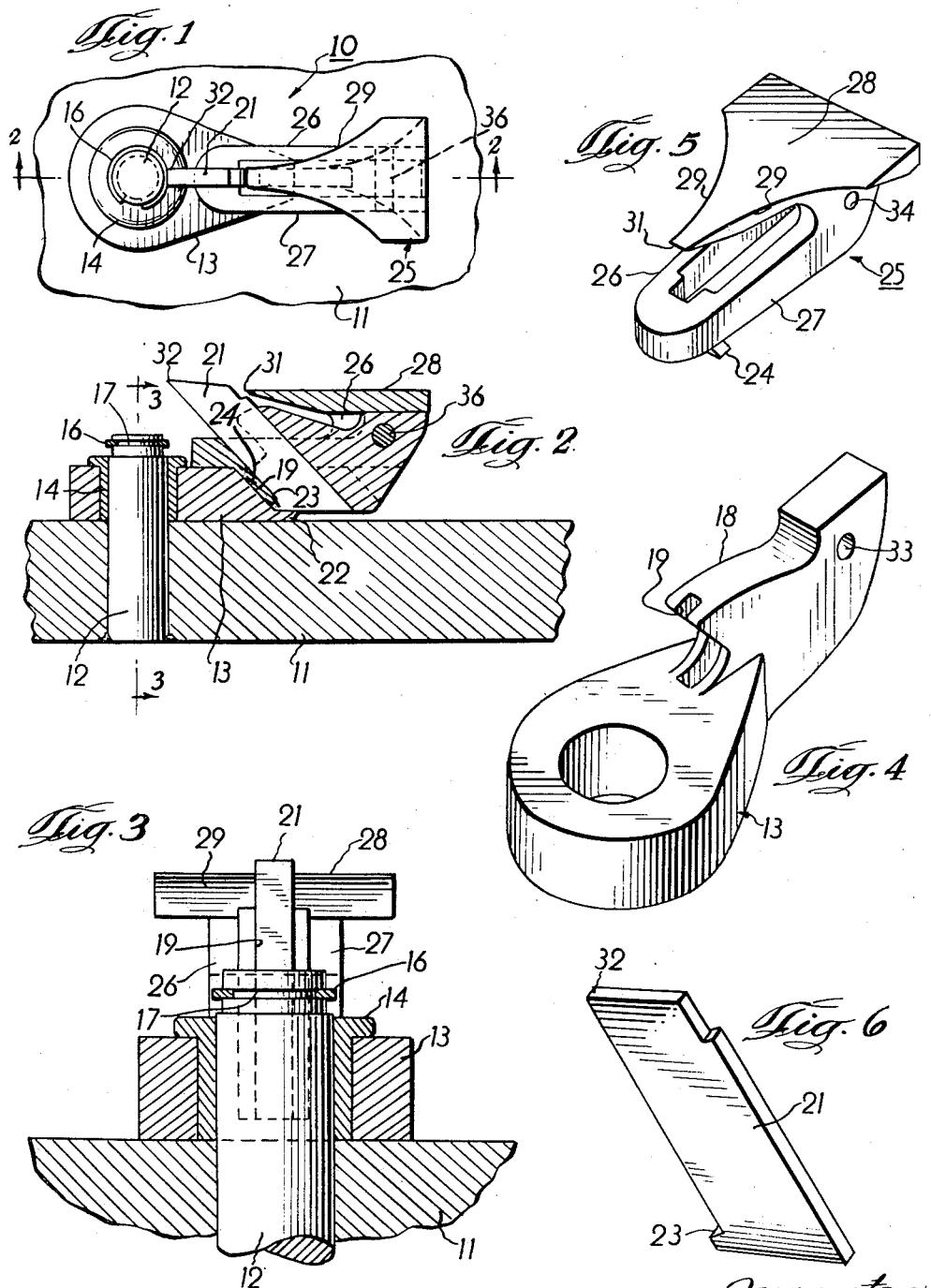

United States Patent Office 2,785,883
Patented Mar. 19, 1957

2,785,883

CUTTER BIT AND MOUNTING THEREFOR

Richard C. Lundquist, Chicago, Ill., assignor to Goodman Manufacturing Company, Chicago, Ill., a corporation of Illinois Original application July 9, 1953, Serial No. 367,019. Divided and this application February 21, 1956, Serial No. 567,006

6 Claims. (Cl. 262—33)

This invention relates to cutter bits used in mining machinery and particularly to an improved mounting therefor.

The cutter bit according to the present invention is particularly adapted for use with a boring arm moving in an orbital path such as is disclosed in my parent application Serial No. 367,019, filed July 9, 1953, for Continuous Miner and Cutter Head Therefor, of which this application is a division.

One of the principal objects of this invention is to provide an improved cutter bit and mounting therefor characterized in its use by moving tangentially to its orbital path.

Another object is to provide in a mounting for a cutter bit a stripper tail which will remove material behind the cutter bit.

Other objects and important features of the invention will be apparent from a study of the specification following taken with the drawing which together show and describe a preferred embodiment of the invention and what is now considered to be the best mode of practicing the principles thereof. Other embodiments of the invention may be suggested to those having the benefit of the teachings herein, and it is therefore intended that the invention not be limited by the precise embodiment herein shown, other embodiments being intended to be reserved especially as they fall within the scope and spirit of the subjoined claims.

In the drawing:

Fig. 1 is a plan view of a cutter bit having the improvements according to the present invention embodied therein;

Fig. 2 is a longitudinal section taken along the line 2—2 of Fig. 1 and looking in the direction of the arrows;

Fig. 3 is a section taken along the line 3—3 of Fig. 1 and looking in the direction of the arrows, certain parts being shown in elevation;

Fig. 4 is a perspective view of a bit holder for the cutter shown in Figs. 1 to 3;

Fig. 5 is a perspective view of a locking member and stripper tail of the cutter shown in Figs. 1 to 3; and Fig. 6 is a perspective view of a cutter bit adapted to be held by the bit holder shown in Figs. 1 to 5 inclusive.

Referring now to the drawing the cutter bit according to the present invention is referred to generally by the reference numeral 10. It is preferably mounted for face cutting upon a cutter bar 11 such as is shown in my aforementioned copending application. The cutter bit 10 is arranged to swivel with respect to the cutter bar or support 11 so that it is always pointing in a direction corresponding to a tangent drawn to the orbital path described by the cutter bar 11.

The cutter bit 10 is accordingly swivelably mounted upon a pin 12, and each cutter 10 includes a bit support 13 having a bushing 14 surrounding the pin 12, so that the bit support 13 may swivel with respect to the support 11 in the manner described. The bit support 13 together with its bushing 14 is mounted for limited endwise movement upon the pin 12, the movement being limited by a C-ring 16 disposed in an annular groove 17 near the end of the pin 12.

The bit support 13 has a tail-like extension 18 which is formed with a slot 19 having its major axis lying along an extended radius of the pin 12. The slot 19 is arranged to receive a cutter bit element 21 which rests against a stop 22 formed on the bit support 13 and extending into the slot 19, see Fig. 2.

The bit element 21 has a shoulder 23 thereon which cooperates with a locking member 24 extending along the leading edge of the bit element 21, and formed as part of a stripper tail referred to generally by the reference numeral 25. The stripper tail 25 has arms 26 and 27 joined together at the leading edge thereof in the form generally of a U, said arms embracing the tail-like extension 18 and the sides of the cutter element 21, as seen more clearly in Fig. 5.

The arms 26 and 27 extend upward as seen in Figs. 2 and 5, and are joined together in an essentially wedge-shape tail 28 having curved shearing edges 29. The smallest dimension 31 of the stripper tail 28 is closest to the cutter bit element 21 and below a plane perpendicular to the axis of the pin 12 and containing a tip 32 of the cutter element 21.

The tail-like extension 18 is bored at 33, and the spaced arms 26 and 27 are likewise bored at 34 to receive a pin 36 passing therethrough thereby locking the stripper tail 25 to the bit support 13.

It will be seen that the stripper tail 25 and the bit support 13 cooperate to hold the bit element 21 between the stop 22 and the locking member 24, thereby preventing the bit element 21 from moving out of the slot 19, the pin 36 maintaining the stripper tail 25 and the bit support 13 in the assembled position described.

While the invention has been described in terms of a preferred embodiment thereof its scope is intended to be limited only by the claims here appended.

I claim as my invention:

1. A mounting for a cutter bit comprising a bit holder, means for enabling said bit holder to swivel with respect to a support, a recess in said bit holder, said recess being of such dimension as to receive a cutter bit, a stop in said recess limiting movement of said cutter bit, a locking member overlying said support and having a portion thereof extending into said recess and impinging against a shoulder formed on said cutter bit, said locking member having portions straddling said bit holder and said cutter bit, a pin passing through said locking member and said bit holder so as to hold said member and said bit holder in locked relationship, and a stripper tail formed as part of said locking member and having cutting edges disposed behind said cutter bit.

2. A mounting for a cutter bit comprising a bit holder, means for enabling said bit holder to swivel with respect to a support, a tail-like extension on said bit holder having a recess therein, said recess being of such dimension as to receive a cutter bit, a stop in said recess limiting movement of said cutter bit, a locking member overlying said support and having a portion thereof extending into said recess and impinging against a shoulder formed on said cutter bit, said locking member having arms straddling said tail-like portion and said cutter bit, a pin passing through said locking member and said bit holder so as to hold said member and said bit holder in locked relationship, and a stripper tail formed as part of said locking member and having cutting edges disposed behind said cutter bit.

3. A mounting for a cutter bit comprising a bit holder, means for enabling said bit holder to swivel with respect to a support, a recess in said bit holder, said recess being of such dimension as to receive a cutter bit, a stop in said recess limiting movement of said cutter bit, said cutter bit having its major axis lying along a radius of said means and spaced from the turning center of said means, a locking member overlying said support and having a portion thereof extending into said recess and impinging against a shoulder formed on said cutter bit, said locking member having portions straddling said bit holder and said cutter bit, a pin passing through said locking member and said bit holder so as to hold said member and said bit holder in locked relationship, and a stripper tail formed as part of said locking member and having cutting edges disposed behind said cutter bit.

4. A mounting for a cutter bit comprising a bit holder, means for enabling said bit holder to swivel with respect to a support, a recess in said bit holder, said recess being of such dimension as to receive a cutter bit, a stop in said recess limiting movement of said cutter bit, said cutter bit having its major axis lying along a radius of said means and spaced from the turning center of said means, a locking member overlying said support and having a portion thereof extending into said recess and impinging against a shoulder formed in said cutter bit, said locking member having portions straddlnig said bit holder and said cutter bit, and a pin passing through said locking member and said bit holder so as to hold said member and said bit holder in locked relationship.

5. A mounting for a cutter bit comprising a bit holder, a recess in said bit holder, said recess being of such dimension as to receive a cutter bit, a stop in said recess limiting movement of said cutter bit, a locking member overlying said support and having a portion thereof extending into said recess and impinging against a shoulder formed on said cutter bit, said locking member having portions straddling said bit holder and said cutter bit, and a pin passing through said locking member and said bit holder so as to hold said member and said bit holder in locked relationship.

6. A mounting for a cutter bit comprising a bit holder, means for enabling said bit holder to swivel with respect to a support, a tail-like extension on said bit holder having a recess therein, said recess being of such dimension as to receive a cutter bit, a stop in said recess limiting movement of said cutter bit, a locking member overlying said support and having a portion thereof extending into said recess and impinging against a shoulder formed on said cutter bit, said locking member having arms straddling said tail-like portion and said cutter bit, and a pin passing through said locking member and said bit holder so as to hold said member and said bit holder in locked relationship.

References Cited in the file of this patent

UNITED STATES PATENTS 2,469,523    Simmons _____ May 10, 1949